United States Patent [19]

Waite et al.

[11] 4,453,261

[45] Jun. 5, 1984

[54] MANUFACTURE OF AQUEOUS POLYMER DISPERSIONS AND COATING COMPOSITIONS DERIVED FROM THEM

[75] Inventors: Frederick A. Waite, Farnham Common; Julian A. Waters, Goring-on-Thames, both of England

[73] Assignee: Imperial Chemical Industries PLC, London, England

[21] Appl. No.: 377,548

[22] Filed: May 12, 1982

Related U.S. Application Data

[63] Continuation of Ser. No. 242,569, Mar. 11, 1981, which is a continuation of Ser. No. 102,269, Dec. 7, 1979, abandoned.

[30] Foreign Application Priority Data

Jun. 18, 1979 [GB] United Kingdom ................ 7921091

[51] Int. Cl.$^3$ .......................... C08L 9/04; C08L 33/00
[52] U.S. Cl. .................................. 524/458; 525/243; 525/263
[58] Field of Search ............... 524/458, 460; 525/263, 525/243

[56] References Cited

U.S. PATENT DOCUMENTS 3,754,054  8/1973  Kimura et al. ...................... 526/518
3,926,755  12/1975  Marans et al. ................. 204/159.15

FOREIGN PATENT DOCUMENTS 941305  11/1963  United Kingdom .
1122397  8/1968  United Kingdom .

*Primary Examiner*—John Kight, III
*Assistant Examiner*—Amelia B. Yarbrough
*Attorney, Agent, or Firm*—Cushman, Darby & Cushman

[57] ABSTRACT

Sterically stabilized aqueous polymer depersions of at least 20% solids content are made by free radical-initiated polymerization of monomers in an aqueous medium at a temperature at least 10° C. higher that the glass transition temperature of the polymer to be formed, in the presence of a pre-formed amphipathic block or graft copolymer which contains in the molecule a component solvatable by the medium and another component capable of associating with the polymer particles formed, the conditions being such that there is at no time present a separate monomer phase. The dispersions are useful as a basis of improved aqueous coating compositions.

11 Claims, No Drawings

MANUFACTURE OF AQUEOUS POLYMER DISPERSIONS AND COATING COMPOSITIONS DERIVED FROM THEM

This is a continuation, of application Ser. No. 242,569 filed Mar. 11, 1981 which in turn is a continuation of application Ser. No. 102,269 filed Dec. 7, 1979 and now abandoned.

This invention relates to the production of dispersions of polymer particles in aqueous liquid media in which the particles are stabilised against flocculation. More particularly, it relates to producing dispersions in which the stabilisation of the particles is achieved substantially by means of a steric mechanism.

Polymer dispersions are well known in which the particles of polymer are stably dispersed in water or an aqueous medium (in which by definition the polymer is insoluble), the stability of the particles being achieved at least to a major extent by the presence on the surface of the particles of electrical charges whereby repulsive forces are generated which overcome the natural tendency of the particles to attract one another. Such dispersions are the products of the so-called emulsion polymerisation processes, a characteristic of which is that the monomer being polymerised, as well as the polymer which is formed, is insoluble in the aqueous medium. The initiation of the polymerisation, and the maintenance of a fine emulsion of the monomer in the aqueous medium, are effected by ionisable species which are dissolved in the aqueous phase.

Other polymer dispersions are well known in which the particles of polymer are stably dispersed in a non-aqueous organic liquid medium (in which again the polymer is insoluble) and in which the particles are stabilised exclusively by means of their having attached to their surfaces polymeric chains of a nature such as to be inherently soluble in the non-aqueous medium; in this way there is formed around each particle a steric barrier of solvated and extended polymer chains which supplies the repulsive force necessary to prevent adjacent particles coming into contact with each other. The charge-stabilisation mechanism previously referred to is in general not applicable to non-aqueous liquid systems. This second type of polymer dispersion is most frequently obtained by means of a so-called non-aqueous dispersion polymerisation process, which has the characteristic that, whilst the polymer ultimately formed is insoluble in the non-aqueous liquid, the monomer being polymerised is actually soluble therein. The polymerisation is carried out in the presence of a steric stabiliser which is an amphipathic molecule incorporating one component which is inherently soluble in the liquid medium and another component which has an affinity for the surface of the polymer particles as they form and which in consequence becomes anchored thereto. A full treatment of the subject of non-aqueous dispersions is to be found in "Dispersion Polymerisation in Organic Media", ed. K. E. J. Barrett (John Wiley, 1975), and there are many published patent specifications relating to it, for example British Specification Nos. 941,305; 1,052,241; 1,122,397; 1,123,611; 1,143,404; 1,231,614.

Whilst for many purposes the production of stable polymer dispersions in non-aqueous organic liquid media is of considerable technical and commercial importance, there are nevertheless advantages in being able to obtain comparable dispersions in water or aqueous media. This is particularly true where the dispersions are intended to use in coating compositions, since the use of water as a carrying liquid avoids the problems of pollution associated with the evaporation of volatile organic liquids. The known aqueous polymer dispersions of the kind referred to above have indeed found extensive use in the formulation of coating compositions, but they nevetheless fall short of being wholly satisfactory for that purpose. Although, in these dispersions, some measure of steric stabilisation of the disperse phase particles may operate, as the result of the use of non-ionic surfactants or protective colloids, the fact that stabilisation is chiefly brought about by the use of low molecular weight, water-soluble surfactants can lead to problems of various kinds, notably water-sensitivity of the derived film. Attempts have previously been made to prepare aqueous dispersions in which the polymer particles are wholly stabilised by a steric mechanism analogous to that which operates in non-aqueous dispersions. These attempts, however, have not been successful; in particular, it has not proved possible to achieve adequate stability of the particles against flocculation except where the polymer content of the dispersion was so low as to render it of little value for the formulation of coating compositions.

In British Specification No. 1,544,335 there is described a process for polymerising an ethylenically unsaturated monomer in water in the presence of a catalyst and also in the presence of a block copolymer dispersion stabiliser having certain defined characteristics. Amongst the advantages that are stated to be achieved by this process, as compared with other polymerisation techniques, are high polymer solids contents of the dispersions obtained and the avoidance of the use of any organic diluents in the polymerisation step. It is evident, however, that the process in question has in common with both conventional aqueous suspension and conventional aqueous emulsion polymerisation techniques that there is present in the reaction mixture, for the greater part of the process, unpolymerised monomer as a separate, distinct liquid phase. Notwithstanding a general statement in the said specification that the polymer particles of the dispersions obtained are in the colloidal size range of 0.1 to 10 microns, none of the examples therein gives any information bearing out this statement; on the contrary, several of those examples indicate clearly that the particles obtained are considerably larger than colloidal size. Thus it is not a characteristic of the process in question that it yields fluid dispersions of polymer in an aqueous medium in which the particles of polymer are of colloidal size and are sterically stabilised against flocculation.

We have now, however, found a process whereby fluid, non-flocculated, sterically stabilised dispersions of polymers in aqueous media may be obtained, the dispersions having high polymer contents and hence being suitable for use in coating compositions.

According to the present invention there is provided a process for the production of a sterically stabilised dispersion of polymer particles in an aqueous medium as hereinafter defined, the process comprising the free radical-initiated polymerisation in the aqueous medium of one or more ethylenically unsaturated monomers at a temperature which is at least 10° C. higher than the glass transition temperature of the polymer which is formed, in the presence in the aqueous medium of a preformed amphipathic block or graft copolymer which contains in the molecule a polymeric component of molecular weight at least 500 which is solvatable by the aqueous medium and another polymeric component which is not solvatable by the aqueous medium and which is capable of becoming associated with the polymer particles formed, the concentration of free monomer in the polymerisation mixture being maintained throughout the process at a level such that at no time does the free monomer form a separate phase and the total amount of monomer polymerised being such that the resulting dispersion contains at least 20% by weight of polymer.

By "aqueous medium" we mean herein a mixture comprising (a) at least 30% by weight of water and (b) not more than 70% by weight of a second constituent which is miscible with water, the nature and proportion of which are such that the mixture as a whole is capable of dissolving the monomer or monomers being polymerised to the extent of at least 3% by weight but is a non-solvent for the polymer formed. The second constituent may be a single substance or it may be a water-miscible mixture of two or more substances.

Preferably the aqueous medium is capable of dissolving the monomer or monomers to the extent of at least 10% by weight.

By "glass transition temperature" (Tg) we mean the temperature at which the polymer which is produced in the process of the invention passes from the glassy state to the rubbery state, or vice versa. The Tg value in question will normally be that of the bulk polymer as 100% material, but in a case where, as subsquently described, a plasticising substance is deliberately added to the polymerisation mixture for the purpose of reducing the effective Tg of the polymer, the Tg value for the purpose of the invention is that of the plasticised polymer. Even where a plasticiser for the polymer is not added as such, the "environmental" Tg of the polymer under the conditions obtaining during polymerisation may be somewhat lower than the bulk Tg value referred to above, owing to some plasticisation of the polymer by residual monomer or other constituents of the polymerisation mixture. Thus it may be possible in practice to operate with a somewhat lower minimum polymerisation temperature than that indicated by the bulk Tg value. However, the effect of such fortuitous plasticisation on the Tg value is difficult to predict and, whilst it can in principle be determined by simple trial and error, it is more convenient under these conditions to choose the temperature of polymerisation by reference to the bulk Tg value. The Tg of a bulk polymer, or of a deliberately plasticised polymer, may be determined for the present purposes, by experimental methods which are well known to those skilled in the art, upon polymer of the same composition as that which is to be formed in the process of the invention but obtained by some other route, for example by polymerisation of the monomers in bulk or in solution, with subsequent addition of plasticiser where appropriate. Alternatively, Tg values can be calculated, from a knowledge of the monomer composition of the polymer, by known methods.

By way of illustration, the following bulk Tg values may be quoted (ratios stated are by weight); for a 50:50 methyl methacrylate/butyl acrylate copolymer, 4° C.; for a 80:20 methyl methacrylate/2-ethylhexyl acrylate copolymer, 41° C.; for a homopolymer of ethyl acrylate, −22° C.; for a homopolymer of methyl methacrylate plasticised in the ratio 60:40 with a neopentyl glycol/butyl alcohol adipate polyester plasticiser, 55° C. Any of these polymer compositions can be successfully prepared in the form of an aqueous latex by the process of the invention at the polymerisation temperatures in the range 70°–90° C. which are normally employed for the polymerisation of acrylic monomers in the presence of an azo initiator.

Ethylenically unsaturated monomers which may be used in the process of the invention include in particular the acrylic monomers, that is to say acrylic acid or methacrylic acid and their alkyl esters such as methyl methacrylate, ethyl methacrylate, butyl methacrylate, ethyl acrylate, butyl acrylate and 2-ethylhexyl acrylate, the hydroxyalkyl esters of the same acids such as 2-hydroxyethyl acrylate, 2-hydroxyethyl methacrylate, and 2-hydroxypropyl methacrylate, and the nitriles and amides of the same acids such as acrylonitrile, methacrylonitrile, acrylamide and methacrylamide. Other monomers which may be used, either alone or in admixture with these acrylic monomers, include vinyl aromatic compounds such as styrene and vinyl toluene, vinyl esters of organic and inorganic acids such as vinyl acetate, vinyl propionate and vinyl chloride, and vinylidene chloride. Yet other comonomers which may be used in conjunction with any of the foregoing monomers include dialkyl maleates, dialkyl itaconates, dialkyl methylenemalonates, isoprene and butadiene.

Where it is desired that the latex polymer should be of the cross-linkable or thermosetting type, the monomers from which it is derived will normally include a proportion of at least one monomer carrying a reactive group, such as one of the hydroxy monomers mentioned above or an N-(alkoxy-alkyl) derivative of acrylamide, e.g N-(n-butoxymethyl) acrylamide.

Preferably, the temperature of polymerisation of the monomer or monomers is at least 20° C., more preferably at least 30° C., higher than the glass transition temperature of the polymer which is formed.

Thus, in principle, the temperature at which the polymerisation is carried out will be determined first and foremost with reference to the Tg value of the polymer which it is proposed to produce in dispersion, and, having decided upon that temperature, one will then proceed to choose an appropriate composition for the aqueous medium in which the process is to be conducted. In order to help the maintaining of a constant polymerisation temperature, it is preferred to arrange that the aqueous medium can boil under reflux at that temperature, and the nature and proportion of the water-miscible second constituent of the mixture will then be selected with this object in mind. Having regard to the fact that, for many of the monomers likely to be used in the process, an effective polymerisation temperature will lie in the range 70°–90° C., the second constituent of the aqueous medium, or a constituent thereof, will usually require to be a liquid of boiling point significantly lower than that of water.

In practice, there may be some interaction between these variables; for example, the freedom of choice of composition of the aqueous medium to suit a particular operating temperature may be restricted by the need to find a water-miscible second constituent which does not have a strong solvent action on the polymer which is formed, otherwise the aqueous medium as a whole may not be a non-solvent for the polymer and there may be a significant production of polymer in solution rather than in dispersion. In the case where the aqueous medium contains a relatively volatile water-miscible liquid, the available range of formulations may be increased by including therein a further water-soluble constituent which does not boil below the boiling temperature of water; such a further constituent may be either a solid or a liquid, capable of assisting the achievement of the necessary solvent/non-solvent characteristics in the aqueous medium. It will be desirable however, to retain a sufficient proportion of the lower-boiling constituent to permit refluxing of the polymerisation mixture. Another factor to be borne in mind is the desirability or otherwise of the continuous phase of the final dispersion permanently containing materials other than water only. Where the water-miscible liquid constituent of the aqueous medium is sufficiently volatile to permit refluxing at the polymerisation temperature, that constituent can usually, if desired, be stripped off by distillation when polymerisation is complete. In contrast, a water-miscible constituent of higher boiling point may not be removable from the continuous phase in this way.

The use of the term "aqueous medium" herein does not imply that water should always be the major constituent of the medium in which the polymerisation is carried out; in many cases, the water-miscible constituent or constituents may predominate in the mixture. In practice, as high a proportion of water as possible is employed, consistent with the aqueous medium being capable of dissolving the monomer being polymerised at least to the extent necessary to avoid the existence of a separate monomer phase, and at the same time being a non-solvent for the polymer produced. Evidently the degree of solvency for the monomer which the aqueous medium is required to possess will depend upon the concentration of free monomer in the polymerisation mixture which it is desired to maintain during the process, which in turn will depend upon the rate at which it is desired that the polymerisation should proceed. In practice, water will most usually constitute 30-70% by weight of the aqueous medium.

Substances which are suitable for use as the water-miscible constituent of the aqueous medium include in particular the lower aliphatic alcohols; the preferred member of this class is methanol, but ethanol is also very suitable. Water-methanol mixtures can be prepared having boiling points which lie both in the optimum polymerisation temperature range and sufficiently above the polymer glass transition temperatures for the process of the invention to be carried out satisfactorily in such mixtures with a variety of acrylic or vinyl monomers. Ethanol is somewhat less preferred than methanol because of its greater effectiveness as a chain terminator in the polymerisation process, and also because it is a more active solvent for many polymers than is methanol. Nevertheless, ethanol is useful where the monomer mixture to be polymerised contains an appreciable proportion of styrene. In the case of polymers derived from arcylic or methacrylic esters of higher alcohols, e.g. lauryl methacrylate, a suitable water-miscible constituent is acetonitrile.

Suitable water-miscible substances having a boiling point above that of water include, for example, butanol, 2-methoxyethanol, 2-ethoxyethanol, ethylene glycol, diethylene glycol and tetraethylene glycol. In general, the proportion of such substances which it is possible to use in the aqueous medium will be relatively low because they tend to be effective solvents for many polymers.

Although simple experimentation may sometimes be called for, the formulation of a suitable aqueous medium which meets the various requirements set out above does not present any serious difficulty in the majority of cases, especially if the Tg of the polymer to be formed does not exceed 60° C.

Steric stabilisation of the polymer particles produced in the process is effected as a result of the presence in the polymerisation mixture of the preformed amphipathic block or graft copolymer. As already stated, this copolymer comprises a solvatable polymeric component and a non-solvatable polymeric component which is capable of associating with the disperse polymer particles. By "solvatable" we mean that the polymeric component in question, if it were an independent molecule rather than part of the graft copolymer, would actually be soluble in the aqueous medium. By virtue of their solvatable character, the chains of this component assume an extended configuration in the environment of the aqueous medium and, because they are restrained by the attachment of the other polymeric component to the surface of the disperse polymer particles, build steric barriers around the particles which overcome their natural tendency to flocculate.

The solvatable polymeric component is, as stated above, derived from a water-soluble polymer, examples of which include non-ionic polymers such as the polyethylene glycols and their monoalkyl ethers, poly(ethylene oxide)—poly(propylene oxide) copolymers containing at least 40% of ethylene oxide and their monoalkyl ethers, polyvinylpyrrolidone, polyacrylamide, polymethacrylamide and polyvinyl alcohol. Preferably the molecular weight of this component is at least 1000 and more preferably at least 2000. The preferred solvatable components are those derived from polyethylene glycols, or their monalkyl ethers, of molecular weight in the range 2000-4000.

The second component of the block or graft copolymer, which is capable of associating with the disperse particles, can in the simplest case be of identical or similar chemical composition to the disperse polymer itself, which by definition is insoluble in (and therefore not solvated by) the aqueous medium. Such a polymeric component will have an inherent tendency to associate with the disperse polymer. However, any polymer which satisfies the more general requirement of non-solvatability by the aqueous medium is suitable as the second component. Examples of second polymeric components include polymers and copolymers derived from methyl methacrylate, ethyl acrylate, butyl acrylate, sytrene, tertbutylstyrene, vinyl toluene, vinyl acetate and acrylonitrile; there may also be incorporated together with one or more of these monomers a functional monomer such as acrylic acid, methacrylic acid, 2-hydroxyethyl methacrylate and 2-hydroxyisopropyl methacrylate.

The pre-formed block or graft copolymer may range in structure from simple block copolymers of the AB, ABA or BAB types, where A and B represent the solvatable and non-solvatable components respectively, through multiple block copolymers of the ABABAB ... types, to "comb" type graft copolymers of the structure $A_nB$, in which a plurality of the solvatable A components are attached at intervals to a polymer backbone constituting the hydrophobic, associatable B component. Preferably the copolymer is of this last-mentioned, "comb" type and has a slight weight excess of the solvatable components A over the non-solvatable components B, for example in a ratio of from 1.1:1 to 2:1. It is also preferred that, in this type of copolymer, the value of n, i.e. the number of A components which are attached to each B component, should be in the range 3–10.

The molecular weight of each solvatable A component is, as already stated, at least 1000 and preferably at least 2000; the molecular weight of each non-solvated B component is preferably at least 1000. Moreover, it is preferred that the total molecular weight of the copolymer should be at least 5000.

The block or graft copolymer may be made by any of the methods which are well known in the art. Thus the solvatable component may be prepared first and then copolymerised with the appropriate monomers so as to give rise to the non-solvatable, associating component in situ, or the non-solvatable component may be prepared first and the solvatable component then prepared in situ. Alternatively, the individual components can both be prepared separately and then be covalently linked to one another through the medium of suitable mutually reactive groups. Thus, for example, in the preparation of the preferred "comb" type graft copolymers, a water-soluble polymer suitable as the A component, such as the mono-methyl ether of a polyethylene glycol of molecular weight 1000 to 2000, can be converted to the acrylic or methacrylic ester, and this intermediate product can then be subjected to free radical-initiated copolymerisation with other unsaturated monomers such as styrene, ethyl acrylate or methyl methacrylate, in order to build up an appropriate non-solvatable polymer backbone constituting the B component from which are pendant a plurality of the A component side chains. Another suitable type of addition copolymer may be made by means of ionic polymerisation methods, for example by preparing a "living" polystyrene block and then reacting this with ethylene oxide in order to build up a poly(oxyethylene) block attached thereto.

If desired, the non-solvatable component of the block or graft copolymer employed as stabiliser may contain groupings which are capable of reacting with the monomer or monomers which are being polymerised in the process of the invention. By this means, the stabiliser becomes covalently linked to the disperse polymer and the stability of the latter towards flocculation may be enhanced. Suitable reactive groupings include ethylenically unsaturated groupings which can copolymerise with the monomer, or functional groups which can react under the conditions of polymerisation with complementary functional groups in the monomer, e.g. epoxide groups which can react with a hydroxylic monomer such as 2-hydroyethyl methacrylate. Methods of introducing such reactive groupings into the copolymer molecule will be apparent to those skilled in the art; for example, in the preparation of a "comb" type graft copolymer as outlined above, the unsaturated monomers with which the intermediate acrylic or methacrylic ester of polyethylene glycol is copolymerised may include an epoxide group-containing monomer, such as glycidyl acrylate or glycidyl methacrylate. In this way, the non-solvatable polymer backbone of the copolymer which is built up will be caused to contain pendant glycidyl groups. The latter may be utilised directly to react with a main monomer containing a functional group, such as a hydroxyl group, during the polymerisation process of the invention. Alternatively, graft copolymer containing the glycidyl groups may be reacted further with an ethylenically unsaturated acid, such as acrylic acid or methacrylic acid, whereby there are introduced into the non-solvatable component of the copolymer double bonds which can copolymerise with the main monomer or monomers during the polymerisation process.

Where the block or graft copolymer contains reactive groupings as just described, it is preferred that there should be present on average from 1 to 20 such groupings in each copolymer molecule. It is, however, to be noted that, by way of further distinction between the present invention and the process described in British Specification No. 1,544,335, it is not essential that the copolymer stabiliser used in the present process should contain such groupings.

The proportion of block or graft copolymer stabiliser which is added to the polymerisation mixture will vary to some extent according to the particular disperse polymer which is involved and the disperse particle size which it is desired that the resulting dispersion should have, and the optimum proportion in any individual case can readily be found by simple experiment. However, for general guidance it may be stated that the proportion in question will usually lie in the range 0.5–20%, and more especially 2–10%, by weight of the disperse polymer content of the dispersion being made. Preferably, the stabiliser is introduced along with the monomers, as explained below.

The process of the invention will usually require the presence in the polymerisation mixture of a suitable catalyst or initiator capable of producing free radicals. Suitable substances for this purpose are those catalysts or initiators well known for use in the polymerisation of acrylic or vinyl monomers which are soluble in the monomers, in particular azo compounds such as azodiisobutyronitrile and 4,4-azobis (4-cyanovaleric acid), or peroxy compounds such as lauroyl peroxide. To some extent, the choice of initiator can influence the temperature at which the polymerisation is carried out and thus may constitute a further factor to be considered in deciding the overall composition of the polymerisation mixture as discussed above. However, azo compounds are generally to be preferred over peroxy compounds in view of the tendency of the latter to promote random grafting of the monomers on to the solvated component of the precursor. The amount of catalyst or initiator used will normally lie in the range 0.5% to 2% of the weight of monomer, and here also the addition is preferably made alone with the monomers being polymerised.

There may also be present during the polymerisation process a chain transfer agent which, unlike the catalyst or initiator, is soluble in the aqueous medium. An example of a suitable agent is thioglycollic acid. The chain transfer agent may be used in an amount of from 0.1% to 2% of the weight of the monomer. The effect of the chain transfer agent is to regulate the molecular weight of the disperse polymer and ultimately to reduce the proportion of finer particles in the disperse phase, thus increasing the average particle size.

In carrying out the process of the invention, it is preferred to introduce the monomer or monomers gradually into the aqueous medium, rather than to add the total monomer charge all at once. This procedure may in fact be essential in many cases if the condition is to be satisfied that at no time during the polymerisation should there be present a separate monomer phase. Where two or more monomers are involved, these may be pre-mixed before being fed into the aqueous medium. A particularly preferred procedure, whereby improved control of particle size of the disperse polymer is achieved, is to add initially to the aqueous medium a small portion of the total monomer charge, together with an appropriate amount of initiator and the greater part of the stabiliser required. This initial charge, which may be added all at once provided that the aqueous medium is capable of dissolving it completely, is allowed to polymerise first; the reaction mixture is initially clear and homogeneous, but subsequently becomes opalescent as a very fine "seed" dispersion of polymer is formed. Following this, the main portion of the monomer charge, containing initiator and the remainder of the stabiliser, is fed in steadily at a rate sufficient to maintain an acceptable speed of polymerisation but not such as to cause monomer to form a separate phase in the polymerising mixture. Where the polymerisation is carried out at the reflux temperature of the aqueous medium, it is preferred to arrange for this main monomer feed to mix with the returning distillate so that it is well diluted before it enters the reaction zone; this distillate will normally be rich in the second, water-miscible constituent of the aqueous medium and will be a good solvent for the monomer being introduced. The rate of monomer feed is preferably such that the monomer is diluted with at least its own volume of returning distillate.

In the case where the process of the invention is performed by first producing, as described above, a "seed" dispersion of polymer, followed by gradual "feed" to this dispersion of the main bulk of the monomer charge, it is possible to form the "seed" particles from a different monomer from that which is subsequently introduced in the "feed" stage. Such "seed" monomer does not carry with it the requirements hereinbefore stated that the polymerisation temperature should be at least 10° C. higher than the glass transition temperature of the polymer (viz. the "seed" polymer) which is formed. Thus, essentially any monomer may be used in the "seed" stage so long as it does not form a separate phase in the reaction mixture and so long as it gives rise to a polymer which is insoluble in the aqueous medium. For example, where the main disperse polymer is to be derived from a mixture of approximately equal parts by weight of methyl methacrylate and 2-ethylhexyl acrylate (Tg of polymer, approximately −10° C.; polymerisation temperature, 76°–80° C.), it is possible to employ methyl methacrylate alone in a "seed" stage; the main monomers are then introduced in the "feed" stage to give rise to the main disperse polymer. It is, however, to be understood that, in a "seed-feed" procedure as just described, the "feed" stage must always be conducted in accordance with the definition of the process of the invention hereinabove given.

Other substances which may be added to the polymerisation mixture include, as already mentioned, a plasticiser for the disperse polymer, where it is desired that the latter should be softer than the unmodified polymer. The addition of plasticiser may, indeed, render it possible to apply the process of the invention to certain monomers where it would otherwise fail. For example, the homopolymer of methyl methacrylate has a Tg of 105° C. and it is practically impossible to operate the present process with methyl methacrylate as the sole monomer so as to produce a stable latex; however, by the addition of plasticiser the Tg can be brought down to a level where the process can successfully be carried out. Suitable plasticisers are any of those which are well known in the art for use with the particular polymer in question; they may be either soluble or insoluble in the aqueous medium. Conveniently the plasticiser may be added to the polymerisation mixture along with the monomer or monomers.

By the process of the invention, aqueous polymer dispersions may readily be made which have disperse phase contents in the range 40–60% by weight, and even as high as 70% by weight, and which are effectively stabilised against flocculation or aggregation of the disperse polymer. The polymer particles may vary considerably in size, a normal range of variation being from 0.05 to 5 microns; within this broad range, the particles in any individual dispersion will usually show a distribution of sizes, in which the largest particles may be up to ten times the diameter of the smallest. Such dispersions are especially suitable as the basis of waterborne coating compositions, having a number of advantages for this purpose over conventional charge-stabilised dispersions made by aqueous emulsion polymerisation procedures. Thus the dispersions made according to the invention are stable towards flocculation of the disperse phase over the whole range of pH, whereas known dispersions are stable only over limited pH ranges; they are also stable in the presence of polyvalent ions, which is not usually the case with ionically stabilised dispersions, and show improved freeze-thaw stability. All these features greatly facilitate the formulation of coating compositions from the dispersions. Furthermore, the coating compositions themselves show greatly improved flow and film integration properties as compared with compositions based on conventional dispersions.

The coating compositions incorporating dispersions made according to the invention may be of either the thermosetting of the thermoplastic type, depending upon whether or not the disperse polymer contains any reactive groupings which can bring about cross-linking, either with or without the addition of a cross-linking agent such aas a melamine-formaldehyde resin, in a heat treatment step subsequent to the application of the composition to a substrate. If desired, an external cross-linking agent can be introduced into the dispersion by adding it to the aqueous medium prior to polymerisation of the monomers from which the disperse polymer is formed, provided that the agent in question does not undergo any reaction under the conditions of polymerisation (which will normally be true of, for example, an amino resin at the temperature at which many acrylic or vinyl monomers are polymerised). Other desirable additives to a coating composition based on the dispersions, which may also be introduced at the polymerisation stage, are reactive silicon compounds capable of reacting with hydroxyl groups in the disperse polymer, whereby the polymer is enabled to produce a coating of enhanced durability; such a compound is, for example, the intermediate QP8-5314 marketed by Dow Corning, Inc.

The actual procedure of making polymer dispersions according to the invention is more straightforward in certain respects than the conventional emulsion polymerisation techniques, in particular that the pH of the polymerisation mixture is not critical, nor is the speed at which it is stirred; also the possibility of carrying out the polymerisation under reflux makes the maintenance of a steady reaction temperature much simpler.

The invention is illustrated but not limited by the following Examples, in which parts and percentages are by weight. The Examples are preceded by descriptions of the preparation of the methacrylate ester of a methoxy(polyethylene glycol) and of the preparation therefrom of graft copolymers suitable for use in the process of the invention.

Preparation A

A mixture of methoxy(polyethylene glycol), molecular weight about 2000 (2000 parts), toluene (800 parts), pyridine (800 parts) and 2:4 dimethyl-6-tertbutylphenol (1.5 parts) is heated to ref lux under a nitrogen blanket, and any water being azeotroped is removed. This being accomplished, methacrylic anhydride (188 parts), is added and the temperature of the mixture is maintained at about 90° C. for three hours. On cooling, a granular mass is formed and a large excess of a medium boiling point aliphatic hydrocarbon is added to complete the precipitation. (The actual choice of aliphatic hydrocarbon is not important). The product is filtered off, washed with aliphatic hydrocarbon (boiling range 60°–80° C.) and dried under vacuum. The product is essentially the methacrylate ester of methoxy(polyethylene glycol), containing little or no unreacted material.

A similar result is obtained if the pyridine is replaced by 2:6-lutidine and the methacrylic anhydride is replaced by methacrylyl chloride (128 parts), a warm filtration step being incorporated at the end of the reaction period to remove lutidine hydrochloride.

Preparation B

A mixture of the methoxy(polyethylene glycol) methacrylate prepared by the method described in (A) above and the appropriate other monomers in the desired ratio as indicated in detail in the Examples below, the total quantity of monomers in each case being 300 parts, azo diisobutyronitrile (3.8 parts), toluene (202 parts), ethanol (202 parts) and water (45 parts) is refluxed for 2½ hours. A further quantity of azodiisobutyronitrile (2.2 parts) is added and the mixture is refluxed for a further 2 hours. The product is a 40% solution of the desired copolymer.

EXAMPLE 1

In part (a) of this Example there is first prepared a "seed" dispersion of a copolymer of methyl methacrylate and butyl acrylate by polymerisation of the monomers in a water-ethanol mixture in the presence of methoxy(polyethylene glycol) methacrylate functioning as a "precursor" for a steric stabiliser. A dispersion polymerisation of methyl methacrylate and butylacrylate is then carried out according to the process of the invention, in the presence of the seed dispersion and of a pre-formed graft copolymer. For comparison, in part (b), the procedure is repeated with the difference that, in the main polymerisation stage, the monomer used is methyl methacrylate alone.

(a) A mixture of methoxy(polyethylene oxide) methacrylate (3.7 parts), prepared by the method described in Preparation A above and having a molecular weight of about 2000, ethanol (12.5 parts), methyl methacrylate (3.7 parts), butyl acrylate (3.7 parts) and azodiisobutyronitrile (0.15 part) is added slowly over a 1 hour period to a refluxing mixture of water (340 parts) and ethanol (85 parts). This resulting mixture is refluxed for a further hour, giving a composition which is opalescent in appearance. To this composition at reflux temperature (84° C.) is added slowly during 2.5 hours a mixture of methyl methacrylate (100 parts), butyl acrylate (100 parts), azodiisobutyronitrile (3 parts) and a 11.6% solution of graft copolymer I, (206 parts). The mixture is heated for one hour more to give a 27% solids content polymer dispersion with a particle size in the range 0.05–0.5μ. The Tg of the main copolymer is 4° C.

The graft copolymer I is prepared by the method described in Preparation B from the methacrylate of methoxy(polyethylene oxide) (molecular weight 2000), methyl methacrylate and butyl acrylate in the weight ratios 5:3:2, the molecular weight of the acrylic portion being about 10,000. The solution of copolymer is diluted with ethanol to the stated concentration.

(b) The above-described procedure is repeated, but with the mixture of methyl methacrylate (100 parts) and butyl acrylate (100 parts) used in the main polymerisation being replaced by methyl methacrylate alone (200 parts). The composition finally obtained in this way contains coarse, flocculated granules of polymer. In this case, the main polymer has a Tg of 110° C., which is above the polymerisation temperature of 84° C.; this illustrates the necessity, according to the invention, of the polymerisation temperature being higher than the Tg of the polymer being formed, if a stable, non-flocculated dispersion is to be obtained.

EXAMPLE 2

(a) The procedure described in Example 1(a) is repeated, excepting that the solution of graft copolymer I is replaced by a 13.2% solution of graft copolymer II (182 parts). The resulting polymer dispersion has a solids content of 27% and contains particles in the size range 0.05–0.5μ.

The graft copolymer II is prepared by the method described in Preparation B from the methacrylate of methoxy(polyethylene oxide) (molecular weight 2000), methyl methacrylate in the ratio of 1:1 by weight, the acrylic portion having a molecular weight of about 10,000. The solution of copolymer is diluted with ethanol to the required concentration.

(b) The procedure described in (a) above is repeated, excepting that the mixture of methyl methacrylate (100 parts) and butyl acrylate (100 parts) used in the main feed is replaced by methyl methacrylate alone (200 parts). Again, as in Example 1(b) the Tg of the resulting polymer is greater than the polymerisation temperature; a granular, flocculated product is obtained.

EXAMPLE 3

In this Example, the general procedure of Examples 1(a) and 2(a) is followed, but the "seed" dispersion initially prepared is of a homopolymer of methyl methacrylate; a pre-formed graft copolymer stabiliser is used both in the making of the seed dispersion and in the main polymerisation, according to the process of the invention.

A mixture of a 37% solution of graft copolymer II in ethanol (8 parts), methyl methacrylate (30 parts) and azodiisobutyronitrile (0.5 part) is added to water (455 parts) and ethanol (114 parts). The resulting clear solution is heated to reflux temperature and is maintained at that temperature for 30 minutes, during which time a fine particle size, low solids dispersion is formed. The dispersion is maintained at the reflux temperature (about 80° C.), and a mixture of methyl methacrylate (149 parts), butyl acrylate (149 parts), a 37% solution of graft copolymer II in ethanol (80 parts) and azodiisobutyronitrile (8.9 parts) is added over 1.5 hours and, while still at reflux temperature during the subsequent 1.5 hours, a further mixture is added of methyl methacrylate (149 parts), butyl acrylate (149 parts) a 37% solution of graft copolymer II in ethanol (64.4 parts) and azodiisobutyronitrile (8.9 parts). Refluxing is continued for 0.25 hour longer to give a fine particle size polymer dispersion (0.06–0.5μ) with a solids content of about 40%. The Tg of the resulting polymer is 4° C.

EXAMPLE 4

This Example illustrates a procedure generally similar to that of Example 3, but both the seed polymer and the polymer formed during the main polymerisation are of more complex monomer composition than those of the previous Example.

To a mixture of distilled water (320 parts), methanol (165 parts), and ethanol (140 parts) at 30° C., is added a mixture of methyl methacrylate (25 parts), ethyl acrylate (28 parts), butyl acrylate (5 parts), 40% solution of graft copolymer II made as described in Preparation B (60 parts) and azodiisobutyronitrile (1.3 parts). The combined mixture is heated at reflux temperature (70°–80° C.) for 30 minutes in order to form a seed dispersion. There is then fed into this dispersion, over a period of 3 hours and into the returning distillate, a pre-formed mixture of methyl methacrylate (225 parts), ethyl acrylate (244 parts), butyl acrylate (43 parts), 2-hydroxypropyl methacrylate (33.5 parts), N-butoxymethylacrylamide (60% solution in butanol) (56 parts), 40% solution of graft copolymer II made as described in Preparation B (80 parts) and azodiisobutyronitrile (8.5 parts). When this addition is complete, a further 1 part of azodiisobutyronitrile is introduced; after 20 minutes more at reflux temperature, a still further 1 part of azodiisobutyronitrile is added, and the reaction mixture is finally heated at reflux temperature for 20 minutes longer. The product is a stable dispersion of polymer of Tg 14° C.; the solids content is 55%. The dispersion did not deposit any sediment on standing for many days.

We claim:

1. A process for the production of a sterically stabilised dispersion of polymer particles in an aqueous medium comprising (a) at least 30% by weight of water and (b) not more than 70% by weight of a second constituent which is miscible with water, the nature and proportion of which are such that the mixture as a whole is capable of dissolving the monomer or monomers being polymerised to the extent of at least 3% by weight but is a non-solvent for the polymer formed, the process comprising the free radical-initiated polymerisation in the aqueous medium of one or more ethylenically unsaturated monomers at a temperature which is at least 10° C. higher than the glass transition temperature of the polymer which is formed, in the presence in the aqueous medium of a pre-formed amphipathic block or graft copolymer which contains in the molecule a polymeric component of molecular weight at least 500 which is solvatable by the aqueous medium and another polymeric component which is not solvatable by the aqueous medium and which is capable of becoming associated with the polymer particles formed, the concentration of free monomer in the polymerisation mixture being maintained throughout the process at a level such that at no time does the free monomer form a separate phase and the total amount of monomer polymerised being such that the resulting dispersion contains at least 20% by weight of polymer.

2. The process as claimed in claim 1, wherein at least one monomer being polymerised is selected from acrylic acid and methacrylic acid and their esters, amides and nitriles.

3. A process as claimed in claim 1 or claim 2, wherein the temperature of polymerisation is at least 30° C. higher than the glass transition temperature of the polymer which is formed.

4. A process as claimed in claim 1 or claim 2, wherein the second constituent of the aqueous medium is methanol or ethanol.

5. A process as claimed in claim 1 or claim 2, wherein the molecular weight of the solvatable polymeric component of the block or graft copolymer stabiliser is at least 2000.

6. A process as claimed in claim 5, wherein the solvatable polymeric component of the block or graft copolymer stabiliser is a polyethylene glycol, or a monoalkyl ether thereof, of molecular weight in the range 2000–4000.

7. A process as claimed in claim 5, wherein the copolymer stabiliser has the structure $A_nB$, where A represents the solvatable component of molecular weight at least 2000, B represents a non-solvatable component of molecular weight at least 1000 and n is an integer in the range 3–10, the weight ratio of all A components to all B components being from 1.1:1 to 2:1 and the total molecular weight of the copolymer being at least 5000.

8. A process as claimed in claim 1 or claim 2, wherein the proportion of stabiliser precursor used is in the range 2–10% by weight of the disperse polymer content of the dispersion.

9. A process as claimed in claim 1 or claim 2, wherein there is initially added to the aqueous medium a small portion, not exceeding 20% by weight, of the total monomer charge, which portion is allowed to polymerise first to form a seed dispersion of polymer and is subsequently followed by the addition thereto and polymerisation of the main portion of the monomer charge.

10. A modification of the process as claimed in claim 1 or claim 2, wherein the aqueous medium already contains a seed dispersion of polymer formed by the previous polymerisation therein of monomer which is different from the main monomer which is to be polymerised as hereinbefore specified, the amount of such different monomer not exceeding 20% of the aggregate of its own weight and the weight of the main monomer.

11. A sterically stabilised dispersion of polymer particles in an aqueous medium whenever prepared by a process as claimed in claim 1 or claim 2.

* * * * *